United States Patent
Kishima et al.

(10) Patent No.: US 9,637,185 B2
(45) Date of Patent: May 2, 2017

(54) WHEEL WELL REAR PORTION STRUCTURE

(71) Applicant: TOYOTA JIDOSHA KABUSHIKI KAISHA, Toyota-shi, Aichi (JP)

(72) Inventors: Fumihiko Kishima, Konan (JP); Kazuya Koizumi, Iwata (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/780,382

(22) PCT Filed: Mar. 5, 2014

(86) PCT No.: PCT/JP2014/055683
§ 371 (c)(1),
(2) Date: Sep. 25, 2015

(87) PCT Pub. No.: WO2014/156525
PCT Pub. Date: Oct. 2, 2014

(65) Prior Publication Data
US 2016/0039479 A1    Feb. 11, 2016

(30) Foreign Application Priority Data
Mar. 27, 2013    (JP) .................. 2013-067105
Oct. 2, 2013    (JP) .................. 2013-207244

(51) Int. Cl.
*B62D 35/02* (2006.01)
*B62D 25/16* (2006.01)
(Continued)

(52) U.S. Cl.
CPC .............. *B62D 35/02* (2013.01); *B62D 25/08* (2013.01); *B62D 25/16* (2013.01); *B62D 35/00* (2013.01); *B62D 35/007* (2013.01); *B62D 37/02* (2013.01)

(58) Field of Classification Search
CPC ........ B62D 25/02; B62D 25/08; B62D 25/16; B62D 25/18; B62D 35/00; B62D 35/007; B62D 35/02; B62D 37/00; B62D 37/02
(Continued)

(56) References Cited

U.S. PATENT DOCUMENTS

| 4,334,694 A | 6/1982 | Iwanicki |
| 4,772,060 A | 9/1988 | Kretschmer |
| 5,277,444 A | 1/1994 | Stropkay |

FOREIGN PATENT DOCUMENTS

| DE | 102008019923 A1 * | 10/2009 | .......... B62D 35/008 |
| EP | 0738650 A2 | 10/1996 | |

(Continued)

OTHER PUBLICATIONS

English translation of JP 2013-023199; retreived Aug. 16, 2016 from the Japan Platform for Patent Information located at https://www.j-platpat.inpit.go.jp/web/all/top/BTmTopEnglishPage.*

(Continued)

*Primary Examiner* — Jason S Daniels
(74) *Attorney, Agent, or Firm* — Oliff PLC

(57) ABSTRACT

In a vehicle to which a wheel well rear portion structure has been applied, a curved portion of an upper wall of a guide portion bulges obliquely toward the vehicle lower side as seen in a side view and is connected to a discharge portion. An air flow flowing in a flow channel flows along the upper wall due to the Coanda effect, so in the air flow along the curved portion the flow component heading toward the vehicle rear side becomes larger. The flow direction of the air flow discharged from the discharge portion substantially coincides with the flow direction of an air flow flowing in the space under the body of the vehicle. In a state in which a drop in the flow speed of the air flow discharged from the (Continued)

discharge portion is controlled, the air flow can be caused to smoothly merge with the air flow.

10 Claims, 15 Drawing Sheets

(51) Int. Cl.
*B62D 35/00* (2006.01)
*B62D 25/08* (2006.01)
*B62D 37/02* (2006.01)

(58) Field of Classification Search
USPC .................. 296/180.1, 181.5, 193.05, 208
See application file for complete search history.

(56) References Cited

FOREIGN PATENT DOCUMENTS

| | | |
|---|---|---|
| FR | 2990402 A1 * 11/2013 | ............. B62D 25/16 |
| JP | S55-94864 A | 7/1980 |
| JP | S63-82663 U | 5/1988 |
| JP | 2003-054451 A | 2/2003 |
| JP | 2013-010441 A | 1/2013 |
| JP | 2013-014283 A | 1/2013 |
| JP | 2013-023199 A | 2/2013 |
| JP | 2014-058182 A | 4/2014 |

OTHER PUBLICATIONS

English translation of FR 2,990,402; reteived Aug. 16, 2016 via PatentTranslate located at www.epo.org.*

* cited by examiner

WHEEL WELL REAR PORTION STRUCTURE

BACKGROUND

Technical Field

The present invention relates to a wheel well rear portion structure.

Background Art

In the device for controlling air rushing out from a wheel well described in non-patent document 1 listed below, an open portion is formed in the rear portion of a wheel well. An underbody nozzle (guide portion) is connected to the open portion, and the underbody nozzle can allow air in the wheel well to flow to the space under the body of the vehicle.

PRIOR ART DOCUMENTS

Non-Patent Documents

Non-patent Document 1: Japan Institute of Invention and Innovation, *Journal of Technical Disclosure*, No. 2008-503232

Patent Documents

Patent Document 1: JP-A No. S55-094864

SUMMARY OF INVENTION

Technical Problem

However, the shape of the underbody nozzle described in non-patent document 1 is such that the air flow is blown out mainly toward the vehicle lower side, from the underbody nozzle to the underbody space. For this reason, the air flow blown out from the underbody nozzle to the underbody space cannot be caused to smoothly merge with the air flow flowing toward the vehicle rear side in the space under the body of the vehicle. For this reason, the above-described device for controlling air rushing out from a wheel well has room for improvement with respect to this point.

In view of these circumstances, it is an object of the present invention to provide a wheel well rear portion structure that can cause an air flow discharged from a guide portion to smoothly merge with an air flow flowing in the space under the body of a vehicle.

Solution to Problem

A wheel well rear portion structure pertaining to a first aspect includes: an introduction portion that is formed at a rear portion of a wheel well covering a wheel, and into which air in the wheel well is introduced; a discharge portion that is disposed at a vehicle rear side of the introduction portion and from which the air introduced via the introduction portion is discharged toward the vehicle rear side and a vehicle lower side; and a guide portion that has a flow channel, by which the introduction portion and the discharge portion communicate with one another and through which the air introduced via the introduction portion flows toward the vehicle rear side and the vehicle lower side, with at least part of an upper wall configuring the flow channel being connected to the discharge portion and bulging obliquely forward toward the vehicle lower side as seen in a side view.

In the wheel well rear portion structure pertaining to the first aspect, the introduction portion is formed at the rear portion of the wheel well covering the wheel, and the discharge portion is disposed on the vehicle rear side of the introduction portion. Additionally, the introduction portion and the discharge portion are communicated with one another by the flow channel of the guide portion. Because of this, the air in the wheel well is introduced from the introduction portion into the flow channel, and the air flow flowing in the flow channel flows toward the vehicle lower side and the vehicle rear side. Additionally, the air flow is discharged from the discharge portion toward the vehicle rear side and the vehicle lower side.

Here, at least part of the upper wall configuring the flow channel being connected to the discharge portion and bulging obliquely forward toward the vehicle lower side as seen in a side view. That is, the section of the upper wall on the discharge portion side bulges obliquely forward toward the vehicle lower side as seen in a side view. Additionally, the air flow flowing in the flow channel flows along the upper wall due to what is called the Coanda effect, so in the air flow flowing along the section of the upper wall on the discharge portion side the flow component toward the vehicle rear side becomes larger. For this reason, the flow direction of the air flow discharged from the discharge portion is mainly toward the vehicle rear side and substantially coincides with the flow direction of the air flow flowing in the space under the body of the vehicle. Because of this, in a state in which a drop in the flow speed of the air flow discharged from the discharge portion is controlled, that air flow can be caused to smoothly merge with the air flow flowing in the space under the body of the vehicle.

A wheel well rear portion structure pertaining to a second aspect is the wheel well rear portion structure pertaining to the first aspect, wherein a blocking portion is disposed between the discharge portion and an underbody portion in the vicinity of the vehicle rear side of the discharge portion, the blocking portion being placed at the vehicle lower side of the underbody portion and blocking air flowing along the underbody portion toward a vehicle front side.

In the wheel well rear portion structure pertaining to the second aspect, the blocking portion is disposed between the discharge portion and the underbody portion in the vicinity of the vehicle rear side of the discharge portion. The blocking portion is placed on the vehicle lower side of the underbody portion and is configured to block the air flowing along the underbody portion toward the vehicle front side. For this reason, even in a case where a counter flow flowing toward the vehicle front side is produced on the vehicle rear side of the discharge portion, the air in the flow channel of the guide portion can be well caused to flow from the discharge portion toward the vehicle rear side.

A wheel well rear portion structure pertaining to a third aspect is the wheel well rear portion structure pertaining to the first aspect or the second aspect, wherein: a groove portion, that opens toward the vehicle front side and extends in a vehicle vertical direction, is formed at the rear portion of the wheel well; and an upper end portion of the groove portion is placed at a vehicle width direction outer side portion of the wheel well and a lower end portion of the groove portion communicates with the introduction portion.

In the wheel well rear portion structure pertaining to the third aspect, the groove portion is formed at the rear portion of the wheel well. The groove portion opens toward the vehicle front side and extends in the vehicle vertical direction. Additionally, the upper end portion of the groove portion is placed at the vehicle width direction outer side portion of the wheel well and the lower end portion of the groove portion communicates with the introduction portion. For this reason, the air flow flowing from the side portion of the vehicle into the wheel well can be efficiently guided to the introduction portion. That is, for example, in a rear wheel well, on the rear side of the wheel the air flow flowing along the side portion of the vehicle tends to flow into the wheel well. Additionally, the air flow flowing into the wheel well flows into the groove portion and is guided along the guide portion to the introduction portion. Because of this, the air flow flowing from the side portion of the vehicle into the wheel well can be efficiently guided to the introduction portion.

A wheel well rear portion structure pertaining to a fourth aspect is the wheel well rear portion structure pertaining to the second aspect, wherein the blocking portion has a sloped portion that slopes toward the vehicle rear side as it approaches the vehicle lower side as seen in a side view.

In the wheel well rear portion structure pertaining to the fourth aspect, the blocking portion has the sloped portion, and the sloped portion that slopes toward the vehicle rear side as it approaches the vehicle lower side as seen in a side view. For this reason, when the counter flow flowing along the underbody portion toward the vehicle front side strikes the blocking portion, the flow direction of the counter flow is changed by the sloped portion toward the vehicle rear side. Because of this, it becomes even easier for the air flow discharged from the discharge portion and the air flow flowing in the space under the body toward the vehicle rear side to flow toward the vehicle lower side of the underbody portion. Consequently, even in a case where a counter flow flowing toward the vehicle front side is produced on the vehicle rear side of the discharge portion, the air in the flow channel of the guide portion can be better caused to flow from the discharge portion toward the vehicle rear side, and the air in the wheel well can be kept even more from rushing out to the side portion of the vehicle.

A wheel well rear portion pertaining to a fifth aspect is the wheel well rear portion pertaining to the second aspect or the fourth aspect, wherein a vertical wall configuring the blocking portion is formed between the underbody portion and the discharge portion; and the vertical wall is placed at the vehicle lower side of the discharge portion and is configured to be elastically deformable in a vehicle front and rear direction.

In the wheel well rear portion structure pertaining to the fifth aspect, the blocking portion is formed in the vertical wall disposed between the underbody portion and the discharge portion. Additionally, the vertical wall is configured to be elastically deformable in the vehicle front and rear direction. For this reason, even if the vertical wall were to interfere with an obstacle on a road surface or the like, the impact force input to the vehicle body can be reduced.

A wheel well rear portion structure pertaining to a sixth aspect is the wheel well rear portion structure pertaining to any one of the first aspect to the fifth aspect, wherein the discharge portion is placed at a vehicle width direction inner side of the introduction portion.

In the wheel well rear portion structure pertaining to the sixth aspect, the air flow flowing from the side portion of the vehicle into the wheel well is kept from being blown out from the rear portion of the wheel well to the vehicle lower side, and the air flow can be caused to smoothly merge with the air flow flowing in the space under the body. That is, for example, in a rear wheel well, the air flow flowing from the side portion of the vehicle into the wheel well tends to descend obliquely downward and inward in the vehicle width direction along the rear portion of the wheel well. Additionally, when the air flow descends obliquely downward and inward in the vehicle width direction along the rear portion of the wheel well, the air flow is blown out from the rear end of the wheel well toward the vehicle lower side.

To address this, in the wheel well rear portion structure pertaining to the sixth aspect, the discharge portion is placed at the vehicle width direction inner side of the introduction portion, so the flow channel is sloped toward the vehicle lower side and inward in the vehicle width direction as seen in a front view. For this reason, the air flow flowing from the side portion of the vehicle into the wheel well is introduced from the introduction portion into the flow channel, and the air flow introduced into the flow channel flows smoothly in the flow channel toward the discharge portion side. Additionally, the air flow is discharged from the discharge portion and smoothly merges with the air flow flowing in the underbody space. For the above reasons, the air flow flowing from the side portion of the vehicle into the wheel well can be kept from being blown out from the rear end of the wheel well toward the vehicle lower side, and the air flow can be caused to smoothly merge with the air flow flowing in the underbody space.

A wheel well rear portion structure pertaining to a seventh aspect is the wheel well rear portion structure pertaining to any one of the first aspect to the fifth aspect, wherein at least part of the introduction portion is formed at the vehicle width direction inner side of a vehicle width direction inner side surface of the wheel.

In the wheel well rear portion structure pertaining to the seventh aspect, for example, the air flow flowing toward the vehicle rear side on the vehicle width direction inner side of the wheel in the wheel well is introduced from the introduction portion into the flow channel and is discharged from the discharge portion. Additionally, the air flow discharged from the discharge portion smoothly merges with the air flow flowing in the underbody space.

A wheel well rear portion structure pertaining to an eighth aspect is the wheel well rear portion structure pertaining to any one of the first aspect to the fifth aspect, wherein the discharge portion is formed at the vehicle width direction inner side of a vehicle width direction inner side surface of the wheel.

In the wheel well rear portion structure pertaining to the eighth aspect, for example, the air flow in the wheel well is guided by the guide portion toward the vehicle width direction inner side of the wheel, and the air flow can be caused to smoothly merge with the air flow flowing in the underbody space on the vehicle width direction inner side of the wheel.

A wheel well rear portion structure pertaining to a ninth aspect is the wheel well rear portion structure pertaining to any one of the first aspect to the eighth aspect, wherein the guide portion is formed in the shape of a duct.

In the wheel well rear portion structure pertaining to the ninth aspect, the guide portion is formed in the shape of a duct, so a drop in the flow speed of the air flow flowing in the flow channel can be controlled and the air flow can be guided to the discharge portion.

A wheel well rear portion structure pertaining to a tenth aspect is the wheel well rear portion structure pertaining to any one of the first aspect to the eighth aspect, wherein the guide portion is formed in the shape of a groove that opens toward the vehicle front side and the vehicle lower side.

In the wheel well rear portion structure pertaining to the tenth aspect, the guide portion is formed in the shape of a groove, so a drop in the flow speed of the air flow flowing in the flow channel can be controlled. Furthermore, the flow path opens toward the vehicle lower side, so mud and/or snow can be kept from collecting in the flow channel. Moreover, even if mud and/or snow were to stick to the flow channel, the mud and/or snow can be easily removed.

Advantageous Effects of Invention

According to the wheel well rear portion structure pertaining to the first aspect, the air flow discharged from the guide portion can be caused to smoothly merge with the air flow flowing in the space under the body of the vehicle.

According to the wheel well rear portion structure pertaining to the second aspect, even in a case where a counter flow is produced on the vehicle rear side of the discharge portion, the air in the wheel well can be well caused to flow from the discharge portion toward the vehicle rear side, and the air flow in the wheel well can be kept from rushing out to the side portion of the vehicle.

According to the wheel well rear portion structure pertaining to the third aspect, the air flow flowing from the side portion of the vehicle into the wheel well can be efficiently guided to the introduction portion.

According to the wheel well rear portion structure pertaining to the fourth aspect, even in a case where a counter flow is produced on the vehicle rear side of the discharge portion, the air in the wheel well can be better caused to flow from the discharge portion toward the vehicle rear side, and the air flow in the wheel well can be kept even more from rushing out to the side portion of the vehicle.

According to the wheel well rear portion structure pertaining to the fifth aspect, even if the vertical wall were to interfere with an obstacle on a road surface or the like, the impact force input to the vehicle body can be reduced.

According to the wheel well rear portion structure pertaining to the sixth aspect, for example, the air flow flowing from the side portion of the vehicle into the wheel well can be kept from being blown out from the end portion of the wheel well toward the vehicle lower side, and the air flow can be caused to smoothly merge with the air flow flowing in the underbody space.

According to the wheel well rear portion structure pertaining to the seventh aspect, for example, the air flow flowing toward the vehicle rear side on the vehicle width direction inside of the wheel can be caused to smoothly merge with the air flow flowing in the underbody space.

According to the wheel well rear portion structure pertaining to the eighth aspect, for example, the air flow in the wheel well can be caused to smoothly merge with the air flow flowing in the underbody space on the vehicle width direction inside of the wheel.

According to the wheel well rear portion structure pertaining to the ninth aspect, a drop in the flow speed of the air flow flowing in the flow channel can be controlled and the air flow can be guided to the discharge portion.

According to the wheel well rear portion structure pertaining to the tenth aspect, a drop in the flow speed of the air flow flowing in the flow channel can be controlled. Furthermore, mud and/or snow can be kept from collecting in the flow channel, and even if mud and/or snow were to stick to the flow channel, the mud and/or snow can be easily removed.

DESCRIPTION OF EMBODIMENTS

First Embodiment

Figure 1:
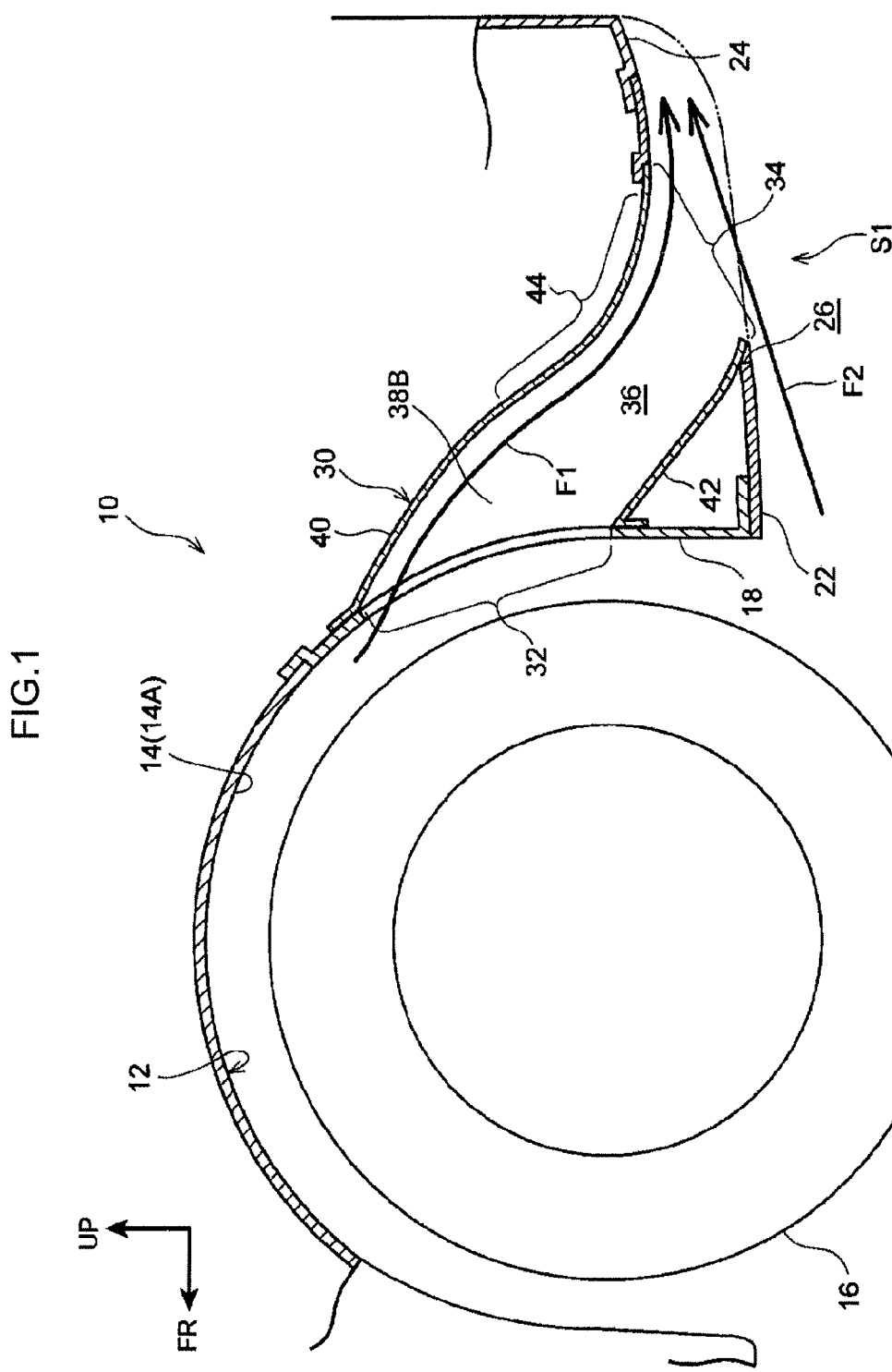
FIG. 1 is a side sectional view (a sectional view along line 1-1 of FIG. 3) showing a rear wheel well of a vehicle to which a wheel well rear portion structure pertaining to a first embodiment has been applied as seen from the vehicle left side.
Figure 2:
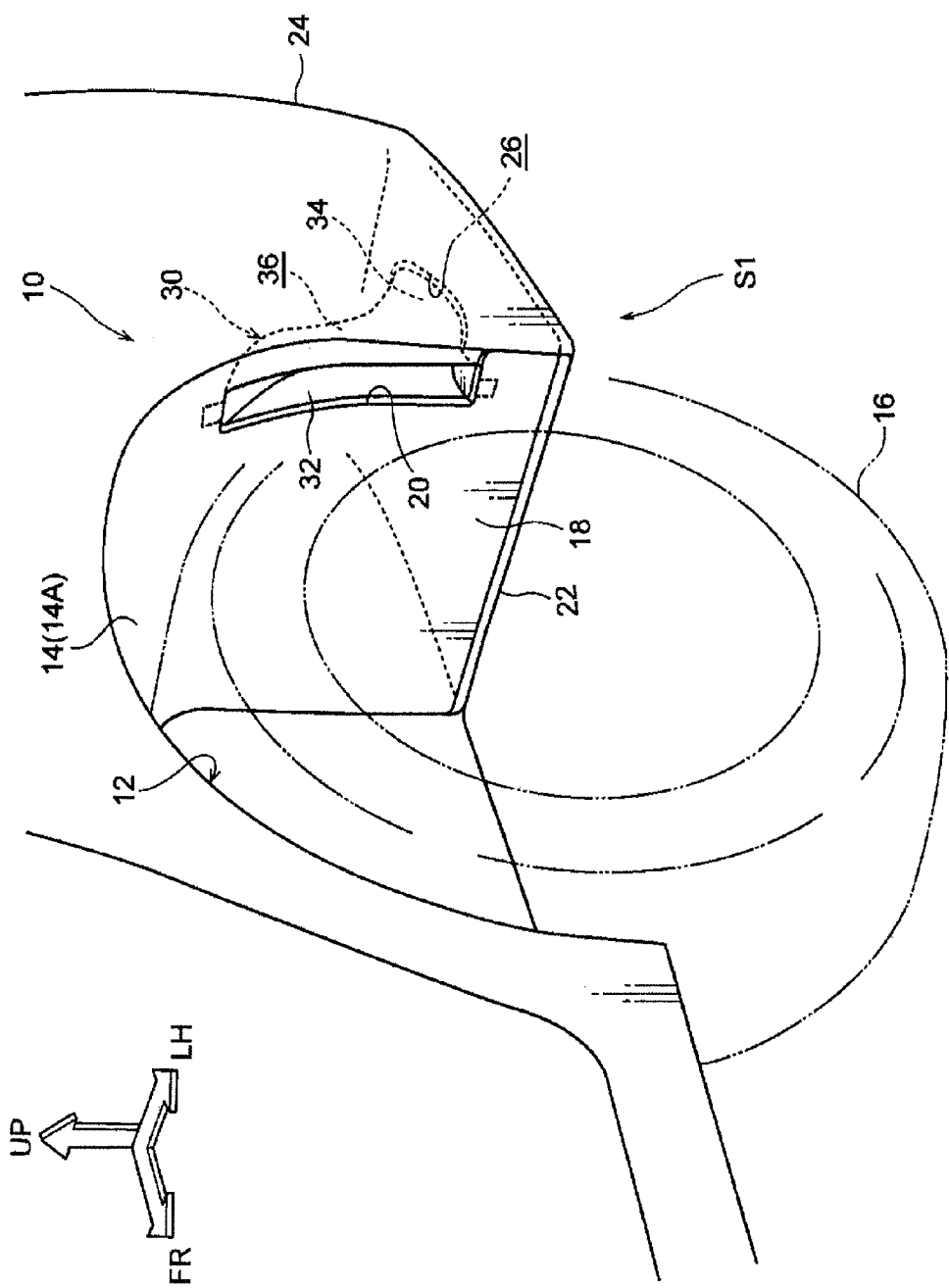
FIG. 2 is a perspective view showing the rear portion of the rear wheel well shown in FIG. 1 as seen obliquely from the vehicle front and left side.
Figure 3:
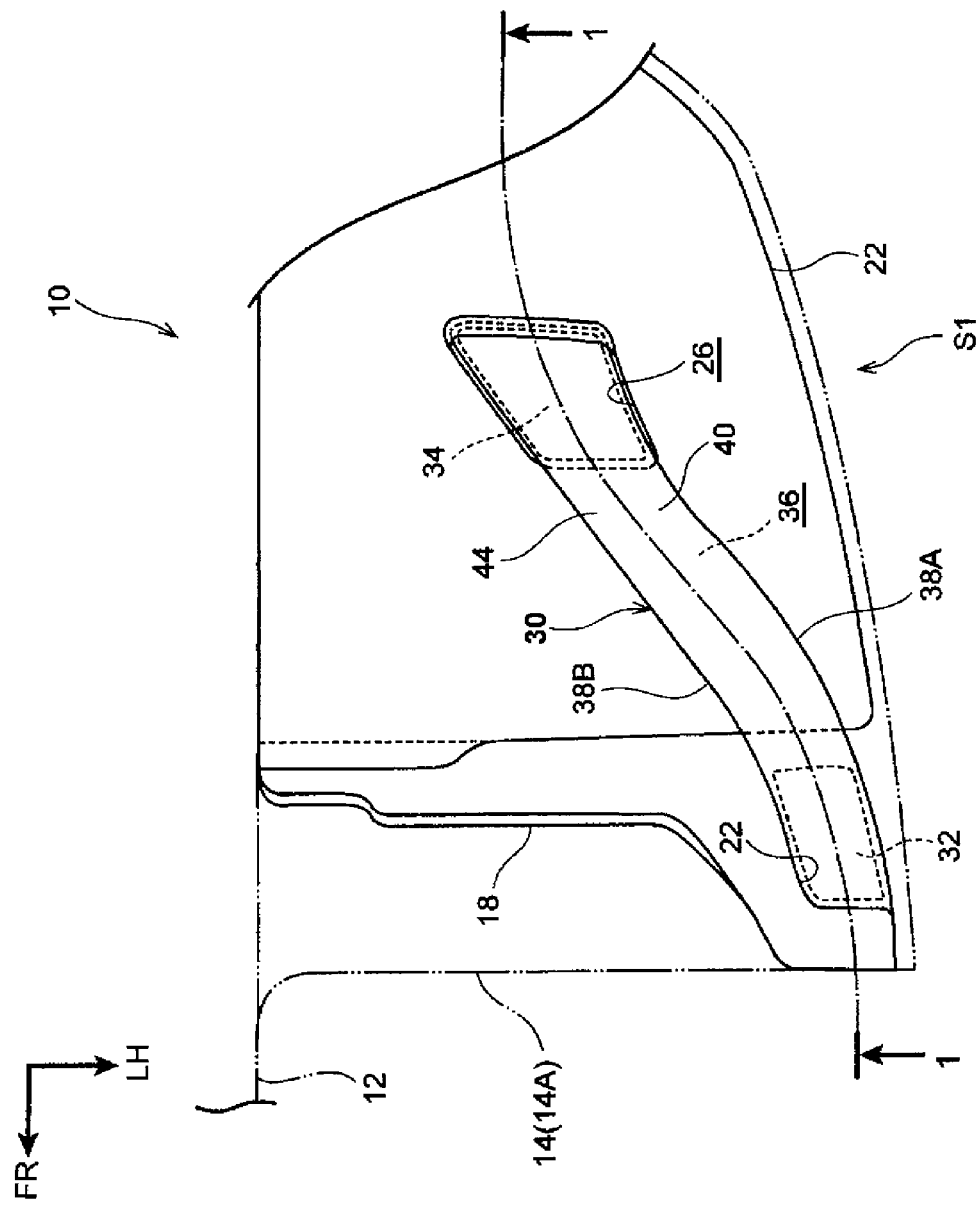
FIG. 3 is a plan view showing a guide portion shown in FIG. 2 as seen from the vehicle upper side.

A vehicle 10 to which a wheel well rear portion structure S1 pertaining to a first embodiment has been applied will be described below using FIG. 1 to FIG. 4. It should be noted that, in the drawings, arrow FR indicates a vehicle forward direction, arrow LH indicates a vehicle leftward direction (one side in a vehicle width direction), and arrow UP indicates a vehicle upward direction. Furthermore, the wheel well rear portion structure S1 is configured to be bilaterally symmetrical in the vehicle width direction, so the wheel well rear portion structure S1 applied to the vehicle left side portion of the vehicle 10 will be described, and description regarding the wheel well rear portion structure S1 applied to the vehicle right side portion of the vehicle 10 will be omitted.

The wheel well rear portion structure S1 pertaining to the first embodiment is applied to the rear portion of a rear wheel well 12 serving as a wheel well placed in the rear portion of the vehicle 10. A fender liner 14 is disposed in the rear wheel well 12. The fender liner 14 is equipped with a substantially semi-cylindrical arch portion 14A that opens toward the vehicle lower side, and the arch portion 14A covers from the vehicle upper side the upper portion of a rear tire 16 serving as a wheel. Furthermore, a bumper seal 18 is disposed on the rear portion of the rear wheel well 12. The bumper seal 18 is attached to the arch portion 14A and is placed slightly curving in such a way as to follow the arch portion 14A as seen in a side view. Furthermore, a cutout portion 20 for placing the front end portion of a later-described guide portion 30 is formed in the vehicle width direction outside end portion of the bumper seal 18, and the cutout portion 20 opens outward in the vehicle width direction as seen from the vehicle front side and is formed along the vehicle width direction outside end portion of the bumper seal 18.

Moreover, a rear spoiler 22 is disposed on the vehicle rear side of the rear wheel well 12. The rear spoiler 22 is placed with its plate thickness direction coinciding with the substantial vehicle up and down direction; the front end portion of the rear spoiler 22 is attached to the lower end portion of the bumper seal 18, and the rear end portion of the rear spoiler 22 is attached to the lower end portion of a rear bumper 24. Furthermore, an open portion 26 for placing the rear end portion of the later-described guide portion 30 is formed through the rear spoiler 22, and the open portion 26 is placed on the vehicle width direction inside of the cutout portion 20.

Additionally, a duct-shaped guide portion 30 is disposed on the vehicle rear side of the bumper seal 18. The guide portion 30 has a substantially rectangular tube shape and extends from the bumper seal 18 toward the vehicle rear side. The open section in the front end portion of the guide portion 30 is an introduction portion 32; the introduction portion 32 opens toward the vehicle front side and is placed in correspondence to the position of the cutout portion 20 of the bumper seal 18. The open section in the rear end portion of the guide portion 30 is a discharge portion 34; the discharge portion 34 opens toward the vehicle lower side and is placed in correspondence to the position of the open portion 26 of the rear spoiler 22. Because of this, the guide portion 30 is sloped toward the vehicle rear side and inward in the vehicle width direction as seen in a plan view and is sloped toward the vehicle rear side and the vehicle lower side as seen in a side view. Additionally, the space in the rear wheel well 12 and the space on the vehicle lower side of the rear spoiler 22 are communicated with one another by the guide portion 30.

Furthermore, the guide portion 30 is configured by a pair of side walls 38A and 38B, an upper wall 40, and a lower wall 42 and has a substantially rectangular closed cross-sectional shape. Additionally, the interior of the guide portion 30 is a flow channel 36, and the introduction portion 32 and the discharge portion 34 are communicated with one another by the flow channel 36. Furthermore, the upper wall 40 is sloped toward the vehicle rear side and the vehicle lower side as seen in a side view, and the section of the upper wall 40 on the discharge portion 34 side (the section connected to the discharge portion 34) is curved in such a way as to bulge obliquely forward toward the vehicle lower side. Additionally, this curved section is a curved portion 44, and the curved portion 44 is smoothly connected to the rear spoiler 22.

Next, the action and effects of the first embodiment will be described.

Figure 4:
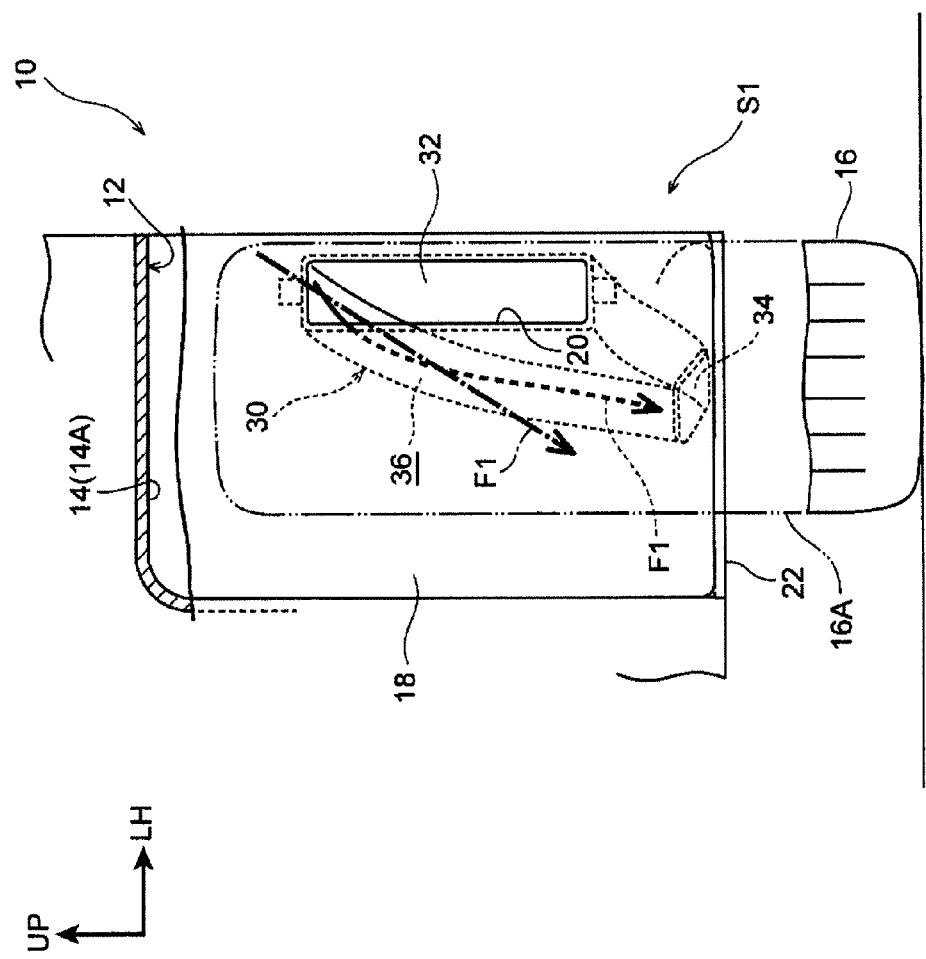
FIG. 4 is a front view showing the rear portion of the rear wheel well shown in FIG. 2 as seen from the vehicle front side.

When the vehicle 10 travels, in the rear wheel well 12 an air flow F1 flowing from the side portion of the vehicle 10 into the rear wheel well 12 tends to descend obliquely downward and inward in the vehicle width direction along the rear portion of the rear wheel well 12 (see arrow F1 indicated by the long dashed short dashed line in FIG. 4). For this reason, if the guide portion 30 were omitted from the rear wheel well 12, the air flow F1 would descend obliquely downward and inward in the vehicle width direction along the rear portion of the rear wheel well 12 and be blown out from the rear end of the rear wheel well 12 toward the vehicle lower side. Because of this, for example, there is the potential for the maneuvering stability of the vehicle 10 to be diminished.

To address this, in the first embodiment, the introduction portion 32 of the guide portion 30 is formed in the vehicle width direction outside section of the rear portion of the rear wheel well 12. For this reason, when the air flow F1 flows into the rear wheel well 12, the air flow F1 is introduced from the introduction portion 32 into the flow channel 36 (see arrow F1 indicated by the dashed line in FIG. 4).

Furthermore, the discharge portion 34 of the guide portion 30 is placed on the vehicle width direction inside of the introduction portion 32, so the guide portion 30 is sloped toward the vehicle lower side and inward in the vehicle width direction as seen in a front view. For this reason, the air flow F1 introduced into the flow channel 36 smoothly flows in the flow channel 36 toward the discharge portion 34. Additionally, the air flow F1 is discharged from the discharge portion 34 and merges with an air flow F2 flowing in the space under the body of the vehicle 10 (see FIG. 1).

Here, the curved portion 44 of the upper wall 40 of the guide portion 30 bulges obliquely forward toward the vehicle lower side as seen in a side view and is connected to the discharge portion 34. Additionally, the air flow F1 flowing in the flow channel 36 flows along the upper wall 40 due to what is called the Coanda effect, so in the air flow F1 flowing along the curved portion 44 the flow component heading toward the vehicle rear side becomes larger. For this reason, the flow direction of the air flow F1 discharged from the discharge portion 34 is mainly toward the vehicle rear side and substantially coincides with the flow direction of the air flow F2 flowing in the space under the body of the vehicle 10. Because of this, in a state in which a drop in the flow speed of the air flow F1 discharged from the discharge portion 34 is controlled, the air flow F1 can be caused to smoothly merge with the air flow F2 flowing in the space under the body of the vehicle 10 (see FIG. 1).

Furthermore, as mentioned above, the curved portion 44 of the upper wall 40 is curved in such a way as to bulge obliquely forward toward the vehicle lower side as seen in a side view, so when the air flow F1 flows along the curved portion 44 due to the Coanda effect, downforce is generated in the vehicle 10. Because of this, the maneuvering stability of the vehicle 10 can be improved.

Moreover, the guide portion 30 is formed in the shape of a duct and extends from the bumper seal 18 toward the vehicle rear side. For this reason, the discharge portion 34 of the guide portion 30 can be easily set in the part of the air flow F2 whose flow speed is fast. Because of this, in a state in which a drop in the flow speed of the air flow F1 is controlled, the air flow F1 can be caused to merge with the part of the air flow F2 whose flow speed is fast.

It should be noted that, in the first embodiment, the discharge portion 34 may also be placed on the vehicle width direction inside of a vehicle width direction inside surface 16A of the rear tire 16. Because of this, the air flow F1 flowing from the side portion of the vehicle 10 into the rear wheel well 12 can be guided by the guide portion 30 toward the vehicle width direction inside of the rear tire 16, and the air flow F1 can be caused to smoothly merge with the air flow F2 flowing in the underbody space on the vehicle width direction inside of the rear tire 16.

Second Embodiment

Figure 5:
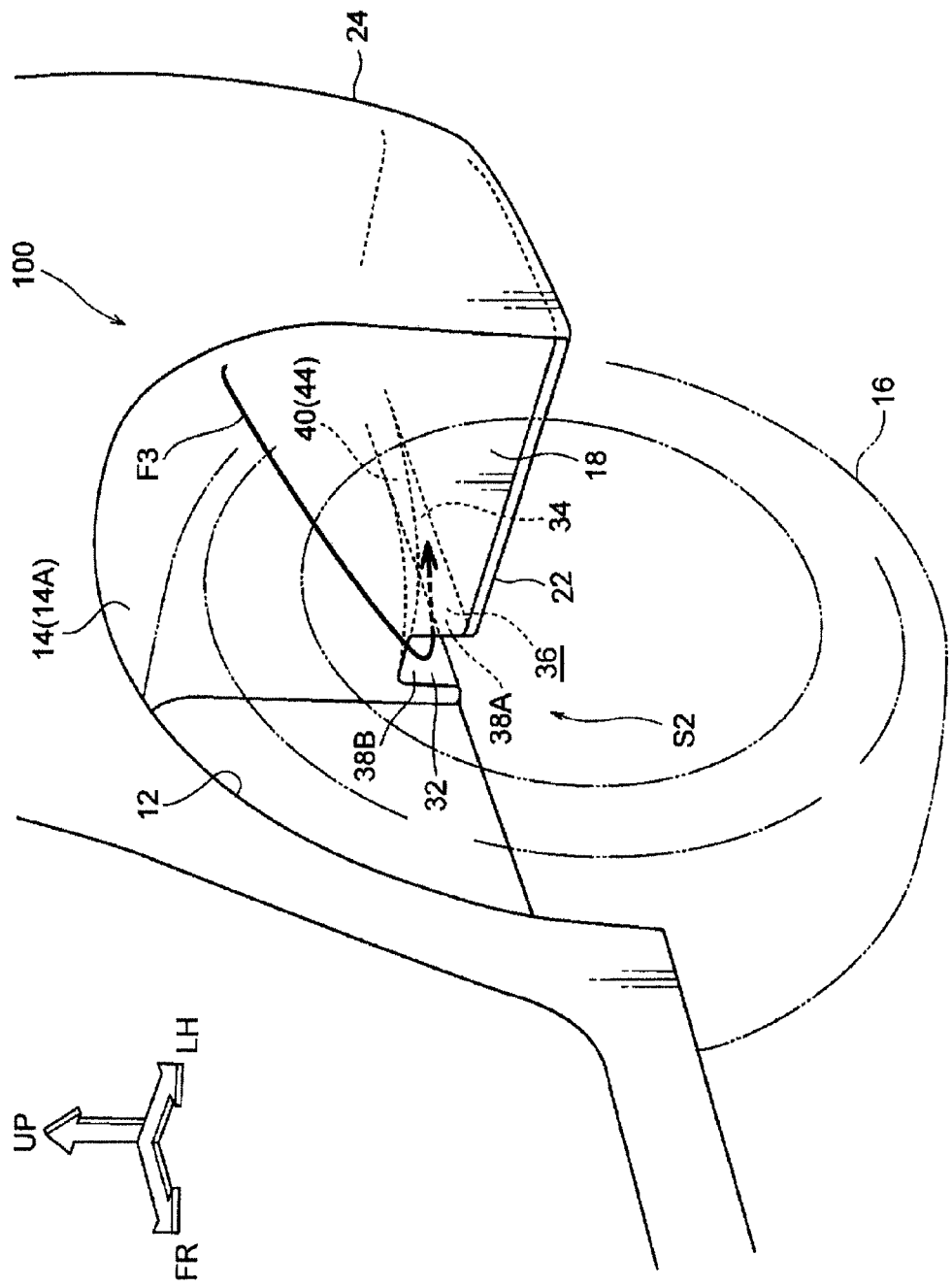
FIG. 5 is a perspective view showing the rear portion of a rear wheel well of a vehicle to which a wheel well rear portion structure pertaining to a second embodiment has been applied as seen obliquely from the vehicle front and left side.
Figure 6:
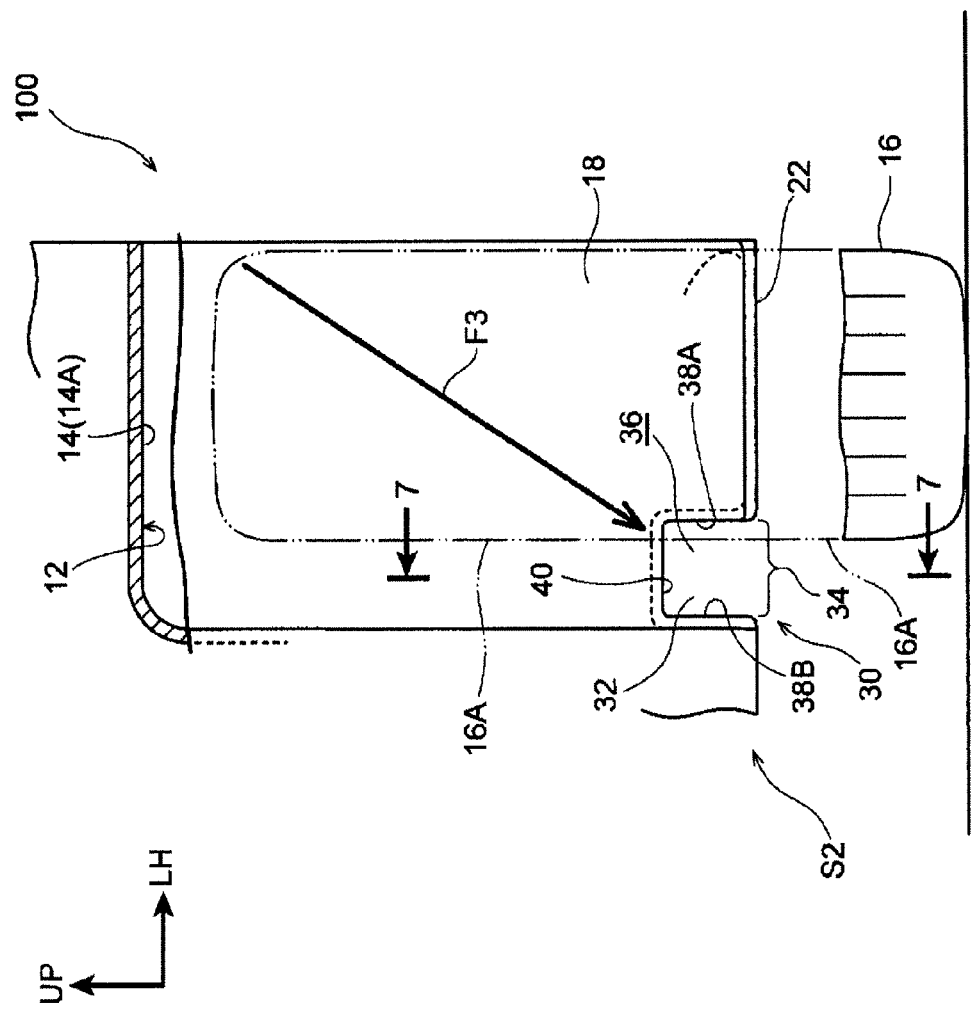
FIG. 6 is a front view showing the rear portion of the rear wheel well shown in FIG. 5 as seen from the vehicle front side.
Figure 7:
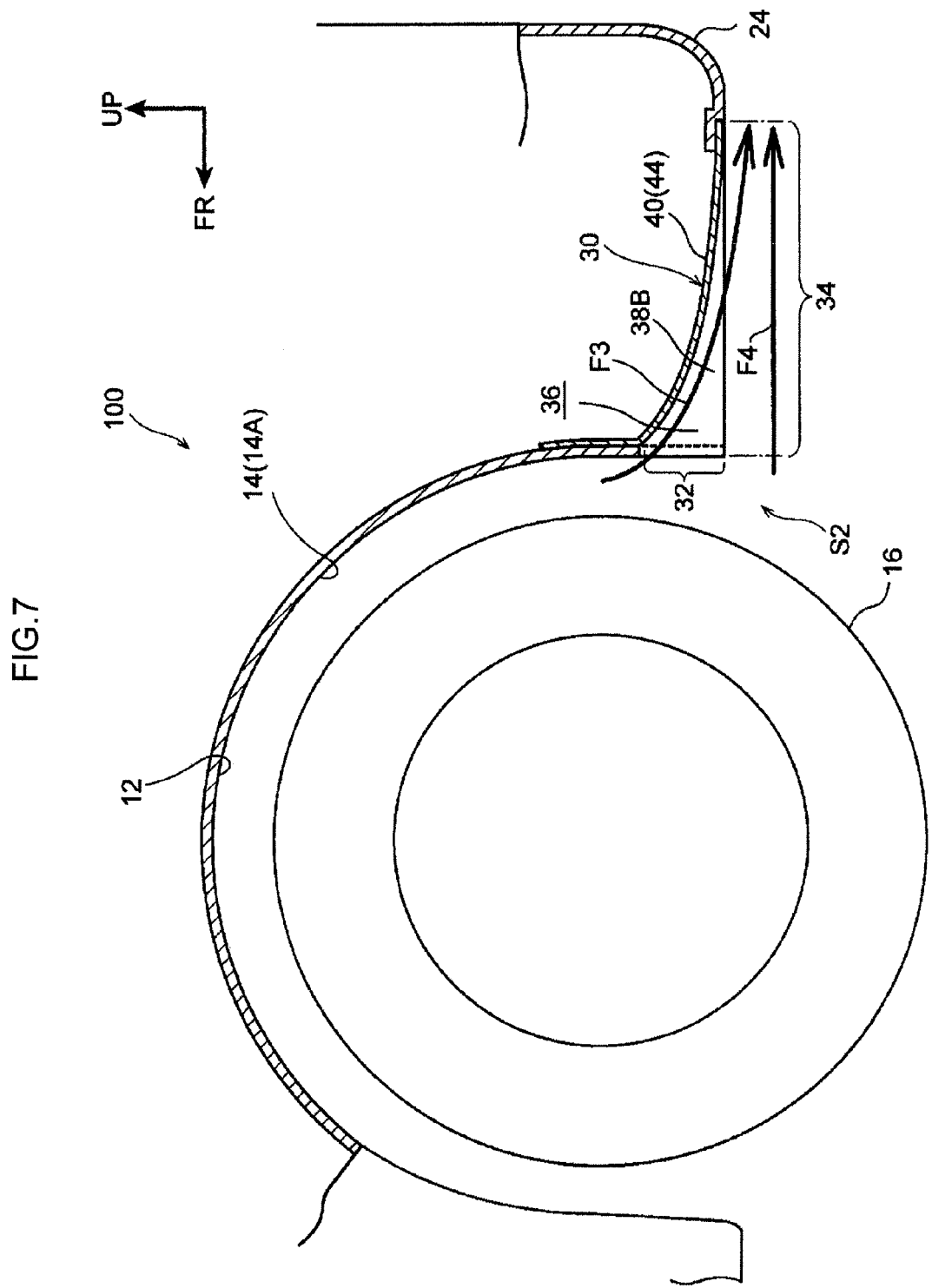
FIG. 7 is a side sectional view (a sectional view along line 7-7 of FIG. 6) showing the rear wheel well shown in FIG. 6 as seen from the vehicle left side.

A vehicle 100 to which a wheel well rear portion structure S2 pertaining to a second embodiment has been applied will be described below using FIG. 5 to FIG. 7. The second embodiment is configured in the same way as the first embodiment except for the points described below.

Namely, in the second embodiment, the guide portion 30 is formed integrally with the vehicle width direction inside section of the rear spoiler 22, and the guide portion 30 is formed in the shape of a groove that opens toward the vehicle front side and the vehicle lower side. For this reason, in the second embodiment, the cutout portion 20 of the bumper seal 18 and the open portion 26 of the rear spoiler 22 are omitted. Additionally, the section of the guide portion 30 that opens toward the vehicle front side is the introduction portion 32, the section of the guide portion 30 that opens toward the vehicle lower side is the discharge portion 34, and the introduction portion 32 and the discharge portion 34 are communicated with one another by the flow channel 36.

Furthermore, the introduction portion 32 of the guide portion 30 is placed in the vehicle width direction inside section of the rear end portion of the rear wheel well 12, and the guide portion 30 extends from the introduction portion 32 toward the vehicle rear side. Moreover, because the guide portion 30 is formed in the shape of a groove as mentioned above, the flow channel 36 is configured by the pair of side walls 38A and 38B and the upper wall 40. Additionally, the upper wall 40 is sloped toward the vehicle rear side and the vehicle lower side as seen in a side view and is curved in such a way as to bulge obliquely forward toward the vehicle lower side (see FIG. 7). That is, the entire upper wall 40 is the curved portion 44. Furthermore, the guide portion 30 is placed on the vehicle width direction inside of the vehicle width direction inside surface 16A of the rear tire 16, and the side wall 38A is placed on the vehicle width direction outside of the vehicle width direction inside surface 16A of the rear tire 16 (see FIG. 6). In other words, part of the guide portion 30 (the introduction portion 32) is placed on the vehicle width direction inside of the vehicle width direction inside surface 16A of the rear tire 16.

Additionally, when the vehicle 100 travels, like in the first embodiment, when an air flow F3 flows from the side portion of the vehicle 100 into the rear wheel well 12, the air flow F3 descends obliquely downward and inward in the vehicle width direction along the rear portion of the rear wheel well 12. That is, the air flow F3 descends toward the introduction portion 32 of the guide portion 30 and is introduced from the introduction portion 32 into the flow channel 36. The air flow F3 introduced into the flow channel 36 flows along the upper wall 40 due to the Coanda effect like in the first embodiment, so in the air flow F3 flowing along the upper wall 40 the flow component heading toward the vehicle rear side becomes larger. For this reason, the flow direction of the air flow F3 discharged from the discharge portion 34 substantially coincides with the flow direction of an air flow F4 flowing in the space under the body of the vehicle. Because of this, in a state in which a drop in the flow speed of the air flow F3 discharged from the discharge portion 34 is controlled, the air flow F3 can be caused to smoothly merge with the air flow F4 flowing in the space under the body of the vehicle 100 (see FIG. 7).

Moreover, in the second embodiment also, the upper wall 40 is curved in such a way as to bulge obliquely forward toward the vehicle lower side as seen in a side view, so downforce is generated in the vehicle 100. Because of this, the maneuvering stability of the vehicle 100 can be improved.

Furthermore, in the second embodiment, the guide portion 30 is formed in the shape of a groove that opens toward the vehicle lower side. For this reason, mud and/or snow sticking to the flow channel 36 falls down, so mud and/or snow can be kept from collecting in the flow channel 36. Furthermore, if mud and/or snow were to stick to the flow channel 36, the mud and/or snow can be easily removed because the guide portion 30 opens toward the vehicle lower side.

Moreover, the guide portion 30 is formed in the shape of a groove and extends from the introduction portion 32 toward the vehicle rear side. For this reason, in a state in which a drop in the flow speed of the air flow F3 is controlled, the air flow F3 can be caused to merge with the part of the air flow F4 whose flow speed is fast. That is, supposing that the rear end corner portion of the rear wheel well 12 were curved (rounded) to form the guide portion 30, there would be the potential for the air flow F3 flowing along the guide portion 30 to become dispersed in the vehicle width direction, resulting in a drop in the flow speed of the air flow F3. To address this, the guide portion 30 is formed in the shape of a groove, so dispersion in the vehicle width direction of the air flow F3 introduced into the flow channel 36 is controlled, and a drop in the flow speed of the air flow F3 can be controlled. Moreover, the guide portion 30 extends from the introduction portion 32 toward the vehicle rear side, so the discharge portion 34 can be easily set in the part of the air flow F4 whose flow speed is fast. For the above reasons, in a state in which a drop in the flow speed of the air flow F3 is controlled, the air flow F3 can be caused to merge with the part of the air flow F4 whose flow speed is fast.

It should be noted that, in the second embodiment, for example, the lip portion of the introduction portion 32 may also be rounded to chamfer that lip portion. Because of this, the air flow F3 descending along the rear portion of the rear wheel well 12 can be well introduced to the introduction portion 32.

Third Embodiment

Figure 8:
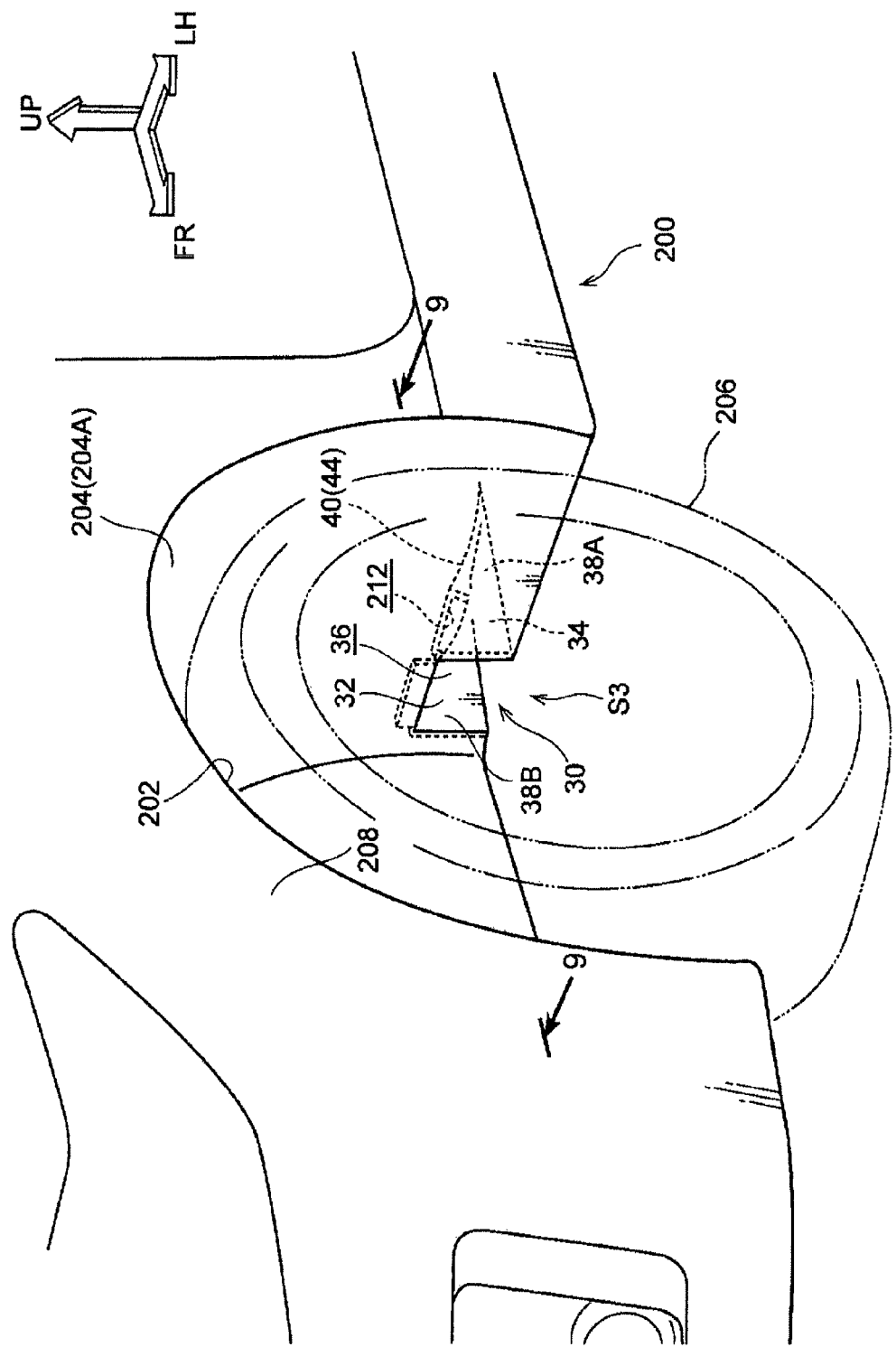
FIG. 8 is a perspective view showing the rear portion of a front wheel well of a vehicle to which a wheel well rear portion structure pertaining to a third embodiment has been applied as seen obliquely from the vehicle front and left side.
Figure 9:
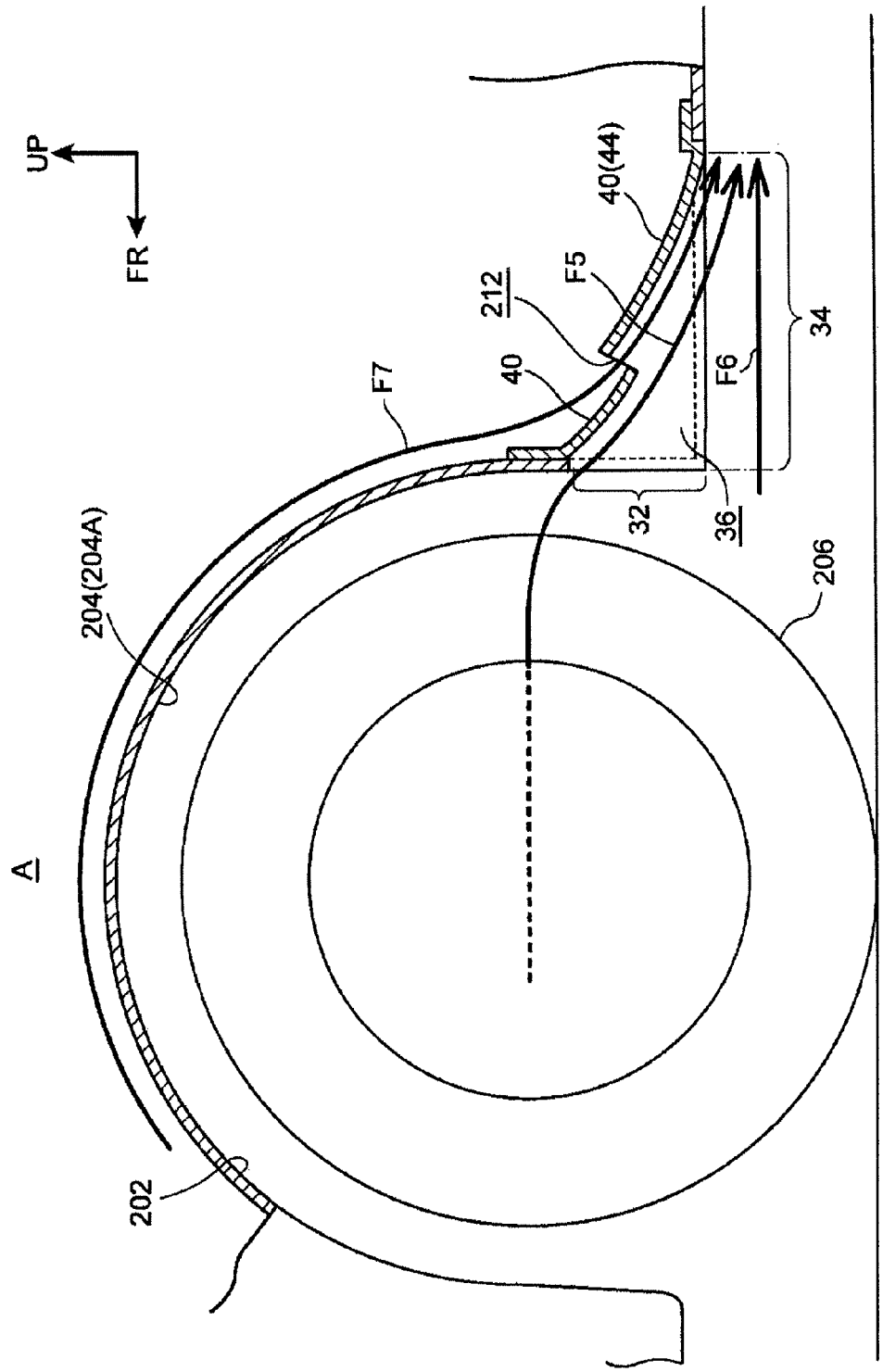
FIG. 9 is a side sectional view (a sectional view along line 9-9 of FIG. 8) showing the front wheel well shown in FIG. 8 as seen from the vehicle left side.

A vehicle 200 to which a wheel well rear portion structure S3 pertaining to a third embodiment has been applied will be described below using FIG. 8 to FIG. 10. The wheel well rear portion structure S3 of the third embodiment is applied to the rear portion of a front wheel well 202 serving as a wheel well placed in the front portion of the vehicle 200. Below, the front wheel well 202 will be described and then the guide portion 30 will be described.

A fender liner 204 is disposed in the front wheel well 202. The fender line 204 is equipped with a substantially semi-cylindrical arch portion 204A that opens toward the vehicle lower side, and the rear end portion of the arch portion 204A extends as far as the rear end portion of the front wheel well 202. Additionally, the arch portion 204A covers from the vehicle upper side the upper portion of a front tire 206 serving as a wheel, and the vehicle width direction outside end portion of the arch portion 204A is united with a fender panel 208.

Additionally, the guide portion 30 is disposed in the vehicle width direction inside section of the rear end portion of the arch portion 204A (the front wheel well 202), and the guide portion 30 is formed in the shape of a groove that opens toward the vehicle front side and the vehicle lower side like in the second embodiment. Additionally, the section of the guide portion 30 that opens toward the vehicle front side is the introduction portion 32, the section of the guide portion 30 that opens toward the vehicle lower side is the discharge portion 34, and the introduction portion 32 and the discharge portion 34 are communicated with one another by the flow channel 36. Because of this, the space in the front wheel well 202 and the space under the body of the vehicle are communicated with one another by the guide portion 30. It should be noted that the vehicle width direction inside section of the rear end portion of the fender liner 204 is cut out in such a way that the introduction portion 32 of the guide portion 30 is placed therein.

Figure 10:
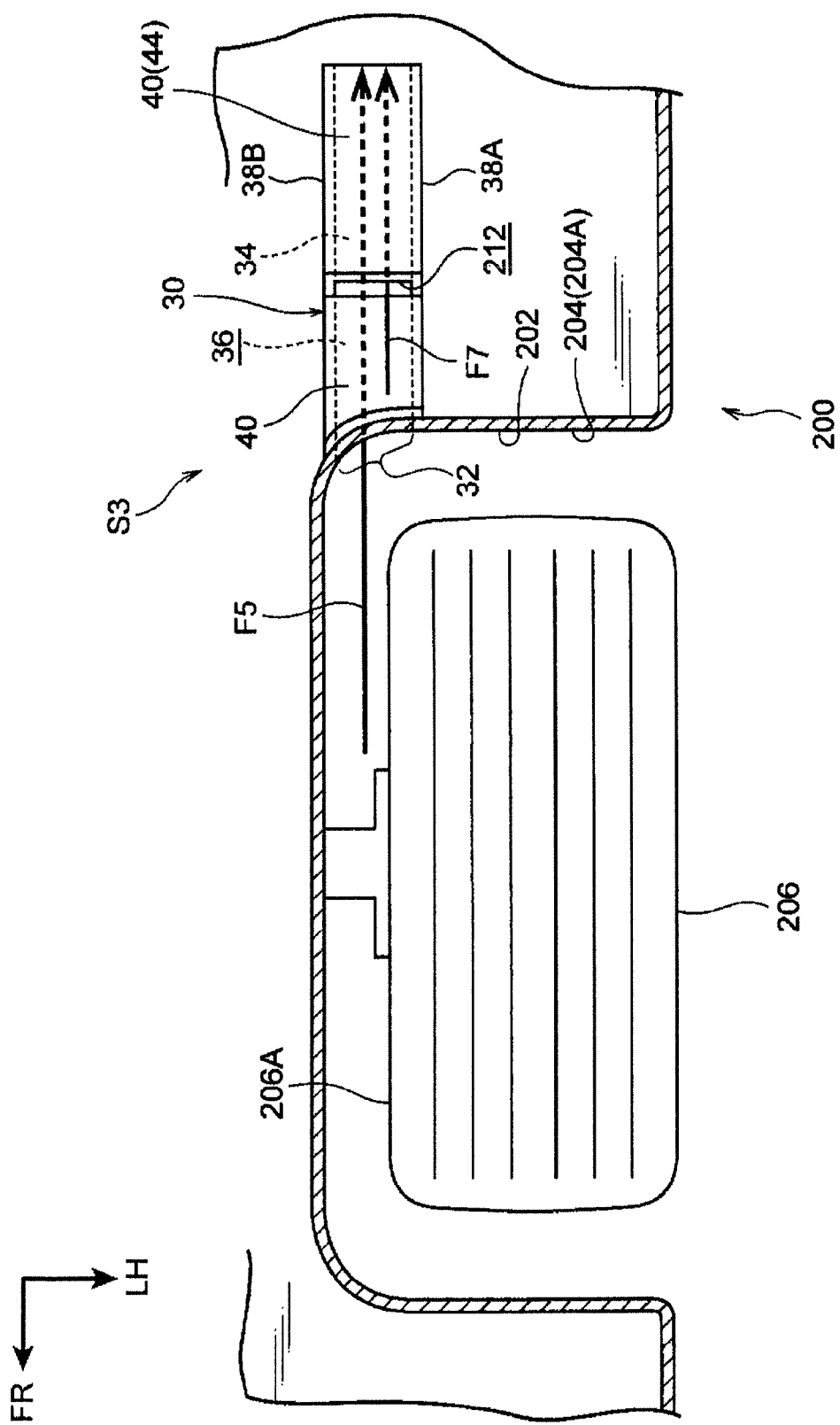
FIG. 10 is a plan view showing the front wheel well shown in FIG. 8 as seen from the vehicle upper side.

Furthermore, the guide portion 30 is placed on the vehicle width direction inside of a vehicle width direction inside surface 206A of the front tire 206, and the side wall 38A is placed on the vehicle width direction outside of the vehicle width direction inside surface 206A of the front tire 206 (see FIG. 10). In other words, part of the guide portion 30 (the introduction portion 32) is placed on the vehicle width direction inside of the vehicle width direction inside surface 206A of the front tire 206. Moreover, the upper wall 40 of the guide portion 30 is sloped toward the vehicle rear side and the vehicle lower side as seen in a side view and, at its vehicle front and rear direction intermediate portion, is formed in a stepwise manner in such a way that the rear portion of the upper wall 40 projects toward the vehicle upper side. Because of this, a substantially rectangular communication hole 212 is formed in the step portion in the upper wall 40, so that the flow channel 36 and a space A between the fender panel 208 and the fender liner 204 are communicated with one another (see FIG. 9). Furthermore, the section on the vehicle rear side of the step portion of the upper wall 40 is the curved portion 44, and the curved portion 44 is sloped toward the vehicle rear side and the vehicle lower side as seen in a side view and is formed bulging obliquely forward toward the vehicle lower side.

Additionally, when the vehicle 200 travels, an air flow F5 flowing toward the vehicle rear side on the vehicle width direction inside of the front tire 206 in the front wheel well 202 is introduced from the introduction portion 32 of the guide portion 30 into the flow channel 36. Here, in the third embodiment also, the curved portion 44 of the upper wall 40 bulges obliquely forward toward the vehicle lower side as seen in a side view. Additionally, the air flow F5 introduced into the flow channel 36 flows along the upper wall 40 of the flow channel 36 toward the vehicle rear side and the vehicle lower side due to the Coanda effect, so in the air flow F5 flowing along the curved portion 44 the flow component heading toward the vehicle rear side becomes larger. For this reason, the flow direction of the air flow F5 discharged from discharge portion 34 is mainly toward the vehicle rear side and substantially coincides with the flow direction of an air flow F6 flowing in the space under the body of the vehicle. Because of this, in a state in which a drop in the flow speed of the air flow F5 discharged from the discharge portion 34 is controlled, the air flow F5 can be caused to smoothly merge with the air flow F6 flowing in the space under the body of the vehicle 200 (see FIG. 9).

Moreover, in the third embodiment also, the upper wall 40 of the flow channel 36 bulges obliquely forward toward the vehicle lower side as seen in a side view, so downforce is generated in the vehicle 200. Because of this, the maneuvering stability of the vehicle 200 can be improved.

Furthermore, the guide portion 30 is formed in the shape of a groove that opens toward the vehicle front side like in the second embodiment. For this reason, in a state in which a drop in the flow speed of the air flow F5 is controlled, the air flow F5 can be caused to merge with the part of the air flow F6 whose flow speed is fast. Furthermore, mud and/or snow can be kept from collecting in the flow channel 36. Moreover, even if mud and/or snow were to stick to the flow channel 36, the mud and/or snow can be easily removed.

Furthermore, the communication hole 212 is formed in the upper wall 40 of the guide portion 30, and the flow channel 36 and the space A between the fender panel 208 and the fender liner 204 are communicated with one another. Additionally, when an air flow F7 flows from the engine compartment into the space A when the vehicle 200 travels, the air flow F7 flows along the fender liner 204 toward the rear end portion of the front wheel well 202 (see FIG. 9). Moreover, the air flow F7 is blown out from the communication hole 212 into the flow channel 36 and merges with the air flow F5. Additionally, the air flow F7 merging with the air flow F5 flows along the curved portion 44 of the upper wall 40 toward the vehicle rear side and the vehicle lower side, is discharged from the discharge portion 34, and smoothly merges with the air flow F6. By disposing the communication hole 212 in the upper wall 40 in this way, the air flow F7 flowing in the space A is pulled into the air flow F5 and the air flow F6 and flows along the fender liner 204 toward the vehicle rear side. For this reason, the air flow F7 is kept from being blown out from the interstice between the fender panel 208 and the fender liner 204 to the side portion of the vehicle 200. Because of this, air turbulence at the side portion of the vehicle 200 can be controlled even more.

It should be noted that, in the third embodiment, the communication hole 212 in the upper wall 40 may also be omitted. In this case, the entire upper wall 40 may also be smoothly formed in such a way as to bulge obliquely forward toward the vehicle lower side as seen in a side view.

Furthermore, in the third embodiment, the guide portion 30 is formed in the shape of a groove, but the guide portion 30 may also be formed in the shape of a duct like in the first embodiment. In this case, the positions of the introduction portion 32 and the discharge portion 34 may also be appropriately set in correspondence to each type of vehicle.

Fourth Embodiment

A vehicle 300 to which a wheel well rear portion structure S4 pertaining to a fourth embodiment has been applied will be described below using FIG. 11 to FIG. 13. The fourth embodiment is configured in the same way as the second embodiment except for the points described below.

Figure 12:
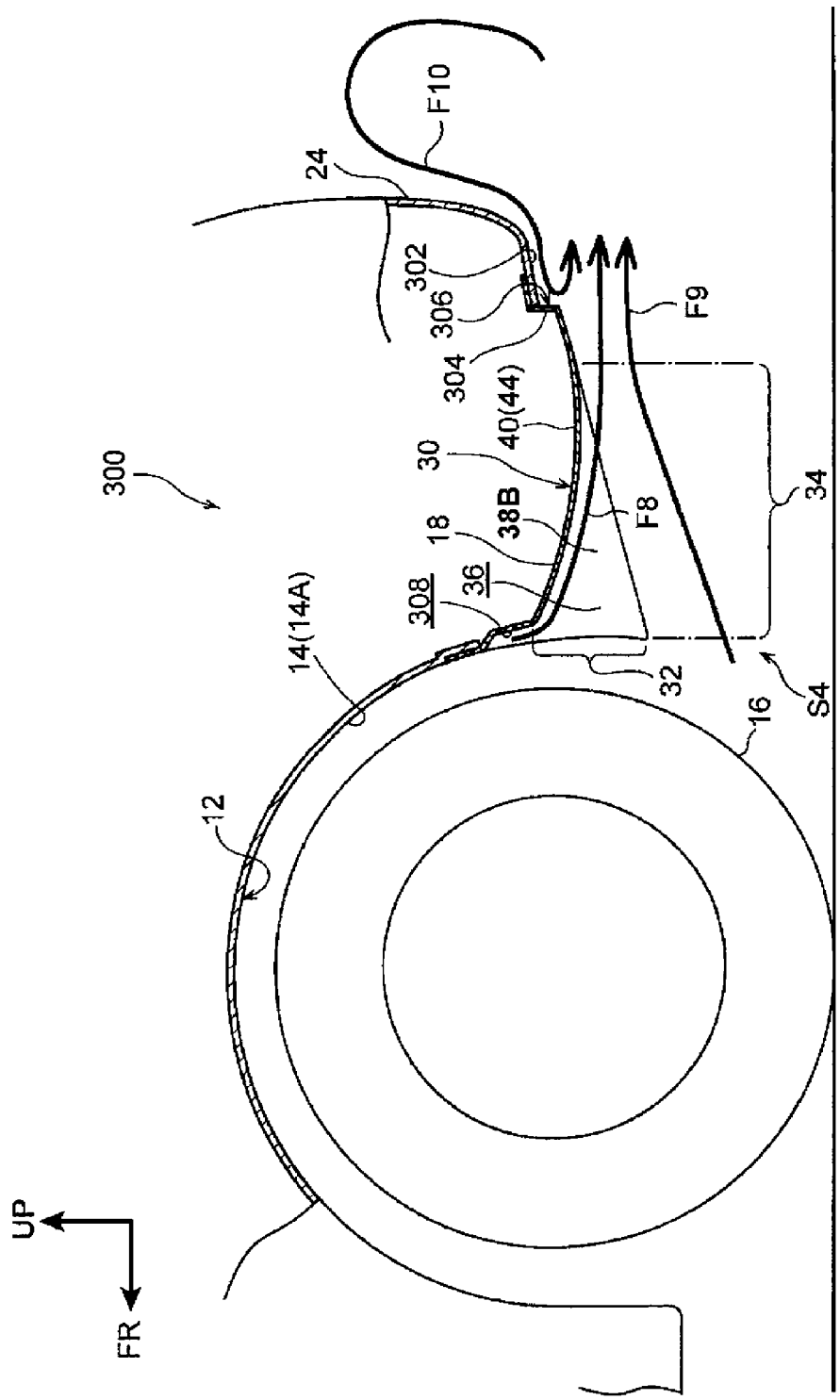
FIG. 12 is a side sectional view (a sectional view along line 12-12 of FIG. 11) showing the rear wheel well shown in FIG. 11 as seen from the vehicle left side.
Figure 13:
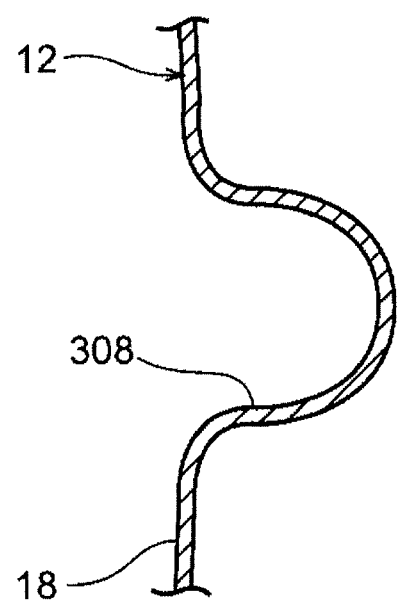
FIG. 13 is an enlarged plan sectional view (a sectional view along line 13-13 of FIG. 11) showing a guide groove shown in FIG. 11 as seen from the vehicle upper side.

Namely, in the fourth embodiment, as shown in FIG. 12, an underbody portion 302 configuring the undersurface of the rear bumper 24 is placed neighboring the vehicle rear side of the discharge portion 34 of the guide portion 30 and is placed on the vehicle upper side of the discharge portion 34.

The lower end portion of the bumper seal 18 is bent toward the vehicle rear side, and the rear end portion of the bottom wall of the bumper seal 18 is bent in the shape of a substantial crank as seen in a side view and joined to the front end portion of the underbody portion 302. Because of this, a vertical wall 304 whose plate thickness direction coincides with the substantial vehicle front and rear direction is formed between the guide portion 30 (the discharge portion 34) and the underbody portion 302. Additionally, the rear surface of the vertical wall 304 is a blocking surface 306 serving as a "blocking portion", and the blocking surface 306 is placed along a direction substantially orthogonal to the vehicle front and rear direction.

Figure 11:
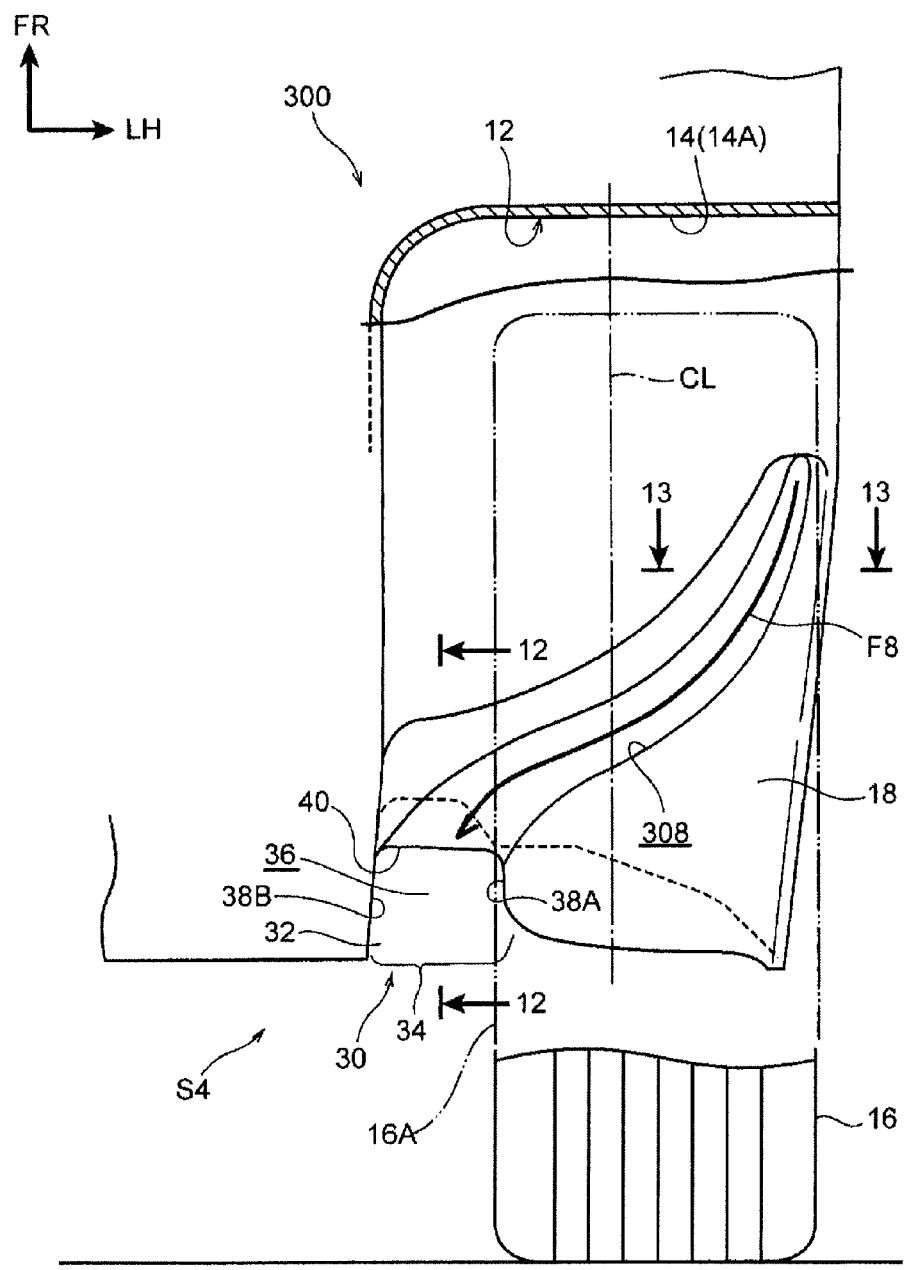
FIG. 11 is a front view showing the rear portion of a rear wheel well to which a wheel well rear portion structure pertaining to a fourth embodiment has been applied as seen from the vehicle front side.

Furthermore, as shown in FIG. 11, a guide groove 308 serving as a "groove portion" is formed in the bumper seal 18 on the vehicle upper side of the introduction portion 32 of the guide portion 30. The guide groove 308 is formed in the shape of a cross-sectionally substantially U-shaped groove that opens toward the vehicle front side (see FIG. 13), and the guide groove 308 extends in the vehicle up and down direction as seen in a front view. Specifically, the guide groove 308 is sloped toward the vehicle lower side heading inward in the vehicle width direction as seen in a front view. Additionally, the upper end portion of the guide groove 308 is placed in the vehicle width direction outside portion of the rear wheel well 12 (the section on the vehicle width direction outside of a width direction centerline CL of the rear wheel well 12), and the lower end portion of the guide groove 308 is communicated with the introduction portion 32.

Additionally, like in the second embodiment, when an air flow F8 flows from the side portion of the vehicle 300 into the rear wheel well 12 when the vehicle 300 travels, the air flow F8 flows into the guide groove 308. Moreover, the air flow F8 flowing into the guide groove 308 descends obliquely downward and inward in the vehicle width direction along the guide groove 308 and is introduced from the introduction portion 32 into the flow channel 36 (see FIG. 11). Because of this, the air flow F8 flowing from the side portion of the vehicle 300 into the rear wheel well 12 can be efficiently guided to the introduction portion 32.

Moreover, the air flow F8 introduced into the flow channel 36 flows along the upper wall 40 due to the Coanda effect like in the second embodiment, so in the air flow F8 flowing along the upper wall 40 the flow component heading toward the vehicle rear side becomes larger. For this reason, the flow direction of the air flow F8 discharged from the discharge portion 34 substantially coincides with the flow direction of an air flow F9 flowing in the space under the body of the vehicle (see FIG. 12). Because of this, in a state in which a drop in the flow speed of the air flow F8 discharged from the discharge portion 34 is controlled, the air flow F8 can be caused to smoothly merge with the air flow F9 flowing in the space under the body of the vehicle 300. Consequently, in the fourth embodiment also, the same action and effects as in the second embodiment are achieved.

In this connection, as shown in FIG. 12, in the vehicle an air flow F10 that wraps around into the space on the vehicle rear side of the rear bumper 24 is produced. Additionally, the air flow F10 tends to flow into the negative pressure region on the vehicle rear side of the rear tire 16, so there are cases where the air flow F10 flows toward the vehicle front side in the space on the vehicle lower side of the underbody portion 302. In other words, there are cases where a counter flow relative to the air flow F8 and the air flow F9 is produced on the vehicle rear side of the discharge portion 34.

Here, in the fourth embodiment, the blocking surface 306 is disposed between the discharge portion 34 and the underbody portion 302. Additionally, the blocking surface 306 is placed on the vehicle lower side of the underbody portion 302 and is configured to block the air flow F10 flowing along the underbody portion 302 toward the vehicle front side. For this reason, even in a case where the air flow F10 flowing toward the vehicle front side is produced on the vehicle rear side of the discharge portion 34, the air in the flow channel 36 of the guide portion 30 can be well caused to flow from the discharge portion 34 toward the vehicle rear side, and the air in the rear wheel well 12 can be kept from rushing out to the side portion of the vehicle. This point will be described below by comparison with a comparative example in which the blocking surface 306 is omitted.

Namely, in the comparative example, the blocking surface 306 is omitted, so, for example, like in the second embodiment, the underbody portion 302 and the discharge portion 34 are placed in positions in which they substantially coincide with one another in the vehicle up and down direction. For this reason, there is the potential for the air flow F10 flowing along the underbody portion 302 toward the vehicle front side to flow into the flow channel 36. Or, there is the potential for the air flow F10 to flow toward the vehicle front side in such a way that it obstructs the discharge portion 34. Because of this, it becomes difficult for the air flow F8 to merge with the air flow F10. As a result, it becomes difficult for the air flow F8 to be discharged from the discharge portion 34, and there is the potential for the air in the rear wheel well 12 to be blown out to the side portion of the vehicle.

To address this, in the fourth embodiment, the blocking surface 306 is disposed on the vehicle rear side of the discharge portion 34. For this reason, in a case where the air flow F10 flowing toward the vehicle front side is produced, the air flow F10 flowing along the underbody portion 302 toward the vehicle front side strikes the blocking surface 306, and the air flow F10 striking the blocking surface 306 flows toward the vehicle lower side. Because of this, the pressure in the space on the vehicle lower side of the blocking surface 306 becomes lower, so it becomes easier for the air flow F8 discharged from the discharge portion 34 and the air flow F9 flowing in the underbody space toward the vehicle rear side to flow into the space on the vehicle lower side of the underbody portion 302 (see FIG. 12). That is, the effect of the air flow F10 on the air flow F8 discharged from the discharge portion 34 is controlled. Consequently, even in a case where the air flow F10 flowing toward the vehicle front side is produced on the vehicle rear side of the discharge portion 34, the air in the flow channel 36 of the guide portion 30 can be well caused to flow from the discharge portion 34 toward the vehicle rear side, and the air in the rear wheel well 12 can be kept from rushing out to the side portion of the vehicle.

(Variations of the Blocking Surface 306 of the Fourth Embodiment)

Figure 14A:
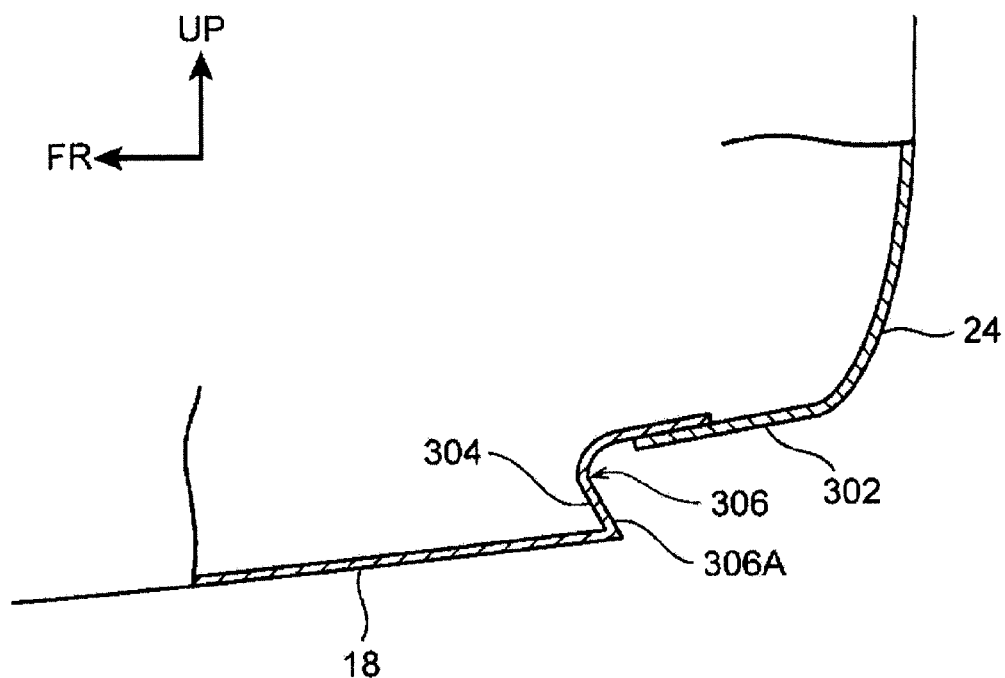
FIG. 14A is a side sectional view showing an example of a variation of a blocking surface shown in FIG. 12.

Variations of the blocking surface 306 of the fourth embodiment will be described below. It should be noted that, in the drawings used in the following description, the guide portion 30 is not illustrated. In variation 1 shown in FIG. 14(A), the blocking surface 306 is formed in the shape of a U that opens toward the vehicle rear side as seen in a side view. Specifically, the upper portion of the blocking surface 306 is curvilinearly sloped toward the vehicle front side heading toward the vehicle lower side as seen in a side view. In other words, the upper portion of the blocking surface 306 is formed in the shape of an arc that is convex obliquely forward toward the vehicle upper side as seen in a side view. The lower portion of the blocking surface 306 is sloped toward the vehicle rear side heading toward the vehicle lower side as seen in a side view and is a sloped surface 306A serving as a "sloped portion".

Additionally, when the air flow F10 flowing along the underbody portion 302 toward the vehicle front side strikes the blocking surface 306, the flow direction of the air flow F10 is changed by the sloped surface 306A toward the vehicle rear side. For this reason, it becomes even easier for the air flow F8 discharged from the discharge portion 34 and the air flow F9 flowing in the underbody space toward the vehicle rear side to flow into the space on the vehicle lower side of the underbody portion 302. Consequently, even in a case where the air flow F10 flowing toward the vehicle front side is produced on the vehicle rear side of the discharge portion 34, the air in the flow channel 36 of the guide portion 30 can be better caused to flow from the discharge portion 34 toward the vehicle rear side, and the air in the rear wheel well 12 can be kept even more from rushing out to the vehicle side portion.

Figure 14B:
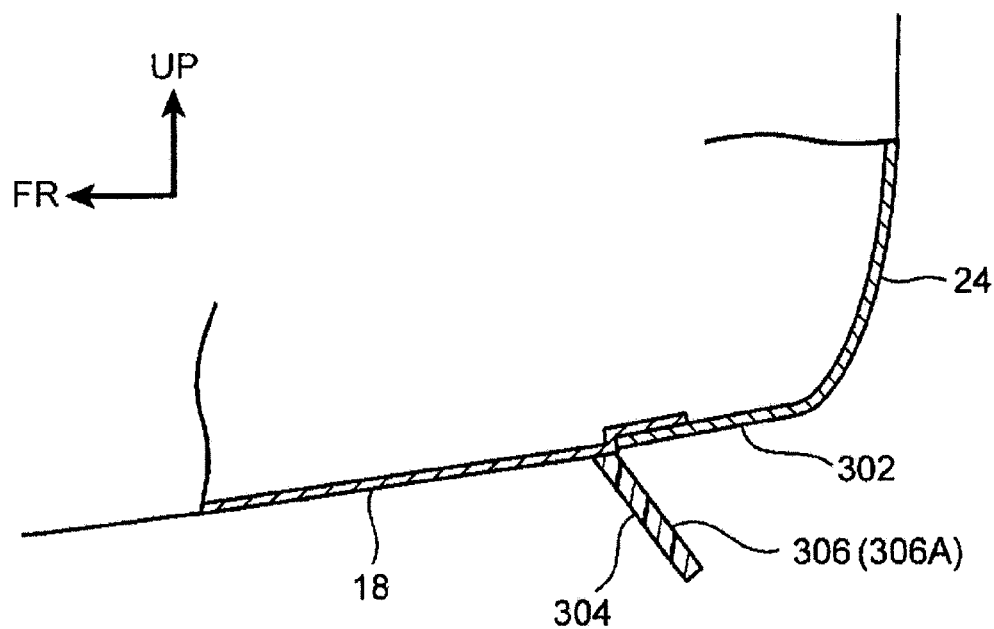
FIG. 14B is a side sectional view showing another example of a variation of the blocking surface shown in FIG. 12.

Furthermore, in variation 2 shown in FIG. 14(B), the vertical wall 304 is formed in the shape of a rib and extends from the end portion of the bumper seal 18 on the vehicle rear side of the guide portion 30 toward the vehicle lower side. Furthermore, the vertical wall 304 is sloped toward the vehicle rear side heading toward the vehicle lower side as seen in a side view, and the rear surface of the vertical wall 304 is the blocking surface 306 and the sloped surface 306A. That is, the entire blocking surface 306 is the sloped surface 306A. Moreover, the vertical wall 304 is made of a material such as an elastomer, for example, is formed integrally with the bumper seal 18, and is configured to be elastically deformable in the vehicle front and rear direction. It should be noted that the vehicle up and down direction positions of the end portion of the bumper seal 18 on the vehicle rear side of the guide portion 30 and the underbody portion 302 of the rear bumper 24 are set in such a way that they substantially coincide with one another.

Additionally, when the air flow F10 flowing along the underbody portion 302 toward the vehicle front side strikes the blocking surface 306, the flow direction of the air flow F10 is changed by the blocking surface 306 (the sloped surface 306A) toward the vehicle rear side. For this reason, in variation 2 also, the same action and effects as in variation 1 are achieved.

Furthermore, in variation 2, the vertical wall 304 is placed on the vehicle lower side of the discharge portion 34, so the distance between the vertical wall 304 and road surfaces becomes shorter and there is the concern that the vertical wall 304 will interfere with an obstacle on a road surface or the like. To address this, the vertical wall 304 is configured to be elastically deformable in the vehicle front and rear direction. For this reason, even if the vertical wall 304 were to interfere with an obstacle on a road surface or the like, the impact force input to the vehicle can be reduced.

It should be noted that, in the fourth embodiment, the introduction portion 32 of the guide portion 30 is placed in the vehicle width direction inside section of the rear end portion of the rear wheel well 12, but the vehicle width direction position of the introduction portion 32 can be arbitrarily set. That is, in the fourth embodiment, the wheel well rear portion structure is configured in such a way that the air flow F8 flowing into the rear wheel well 12 is guided by the guide groove 308 to the introduction portion 32, so, for example, the introduction portion 32 of the guide portion 30 may also be placed in the vehicle width direction outside section of the rear end portion of the rear wheel well 12. In this case, the guide groove 308 extends along the substantial vehicle up and down direction as seen in a front view. In other words, for the "groove portion that extends in the vehicle up and down direction" of the present invention, it suffices for the guide groove 308 to extend in the vehicle up and down direction in such a way that the air flow F8 flowing into the rear wheel well 12 is guided by the guide groove 308 to the introduction portion 32 in correspondence to the position of the introduction portion 32.

Furthermore, in the first embodiment to the third embodiment also, the wheel well rear portion structures may be configured in such a way that the vertical wall 304 (the blocking surface 306) is disposed on the vehicle rear side of the discharge portion 34 like in the fourth embodiment. Moreover, in the first embodiment also, the wheel well rear portion structure may be configured in such a way that the guide groove 308 is disposed like in the fourth embodiment.

Moreover, in the first embodiment, the guide portion 30 is formed in the shape of a duct, but the guide portion 30 may also be formed in the shape of a groove like in the second embodiment. In this case, the introduction portion 32 of the guide portion 30 is formed in the vehicle width direction outside section of the rear portion of the rear wheel well 12, and the guide portion 30 is placed sloping toward the vehicle rear side and inward in the vehicle width direction as seen in a plan view.

Figure 15A:
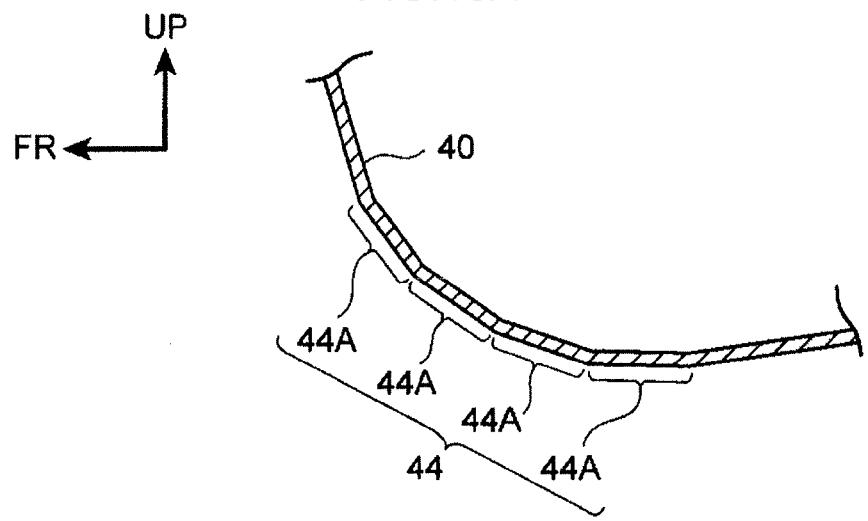
FIG. 15A is a side sectional view showing another example of a curved portion of an upper wall of the guide portion.
Figure 15B:
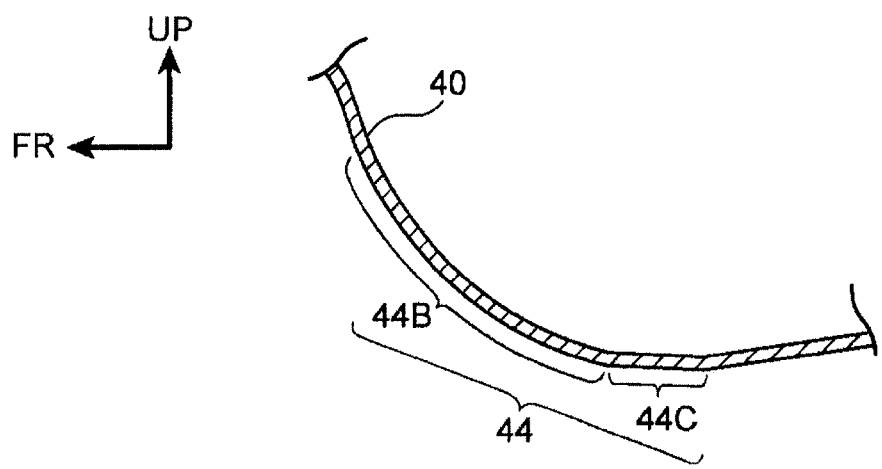
FIG. 15B is a side sectional view showing still another example of the curved portion of the upper wall of the guide portion.

Furthermore, in the first embodiment to the fourth embodiment, the curved portion 44 is curvilinearly curved in such a way as to bulge obliquely forward toward the vehicle lower side as seen in a side view, but the shape of the curved portion 44 is not limited to this. For example, as shown in FIG. 15(A), the curved portion 44 may also be configured by plural linear portions 44A as seen in a side view, so that the entire curved portion 44 is formed in such a way as to bulge obliquely forward toward the vehicle lower side as seen in a side view. Furthermore, as shown in FIG. 15(B), the curved portion 44 may also be configured by a curvilinearly shaped curved portion 44B and a linearly shaped linear portion 44C, so that the entire curved portion 44 is formed in such a way as to bulge obliquely forward toward the vehicle lower side as seen in a side view.

Moreover, in the first embodiment, part of the upper wall 40 is curvilinearly curved in such a way as to bulge obliquely forward toward the vehicle lower side as seen in a side view, but the entire upper wall 40 may also be formed in such a way as to bulge obliquely forward toward the vehicle lower side as seen in a side view.

Figure 15C:
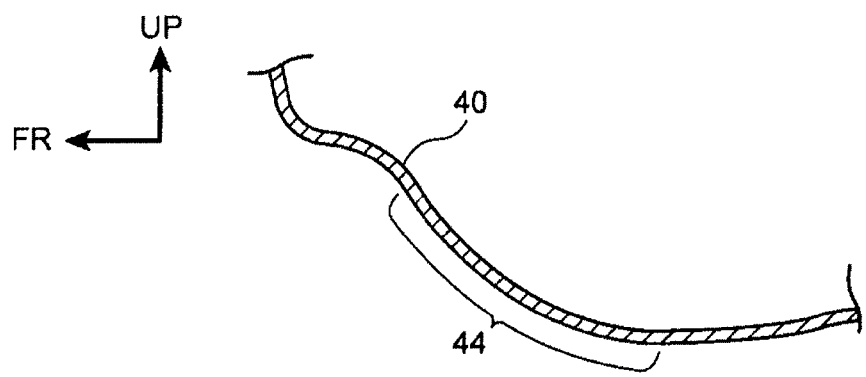
FIG. 15C is a side sectional view showing another example of the shape of the upper wall.

Furthermore, in the second embodiment to the fourth embodiment, the entire upper wall 40 is curvilinearly curved in such a way as to bulge obliquely forward toward the vehicle lower side as seen in a side view. Instead of this, as shown in FIG. 15(C), part of the upper wall 40 (the section connected to the discharge portion 34) may also be formed in such a way as to bulge obliquely forward toward the vehicle lower side as seen in a side view.

Moreover, in the second embodiment to the fourth embodiment, the guide portion 30 is formed in the shape of a groove and is configured by the pair of side walls 38A and 38B and the upper wall 40, but one of the pair of side walls 38A and 38B may also be omitted.

Furthermore, in the second embodiment to the fourth embodiment, part of the guide portion 30 is placed on the vehicle width direction inside of the rear tire 16 (the front tire 206), but all of the guide portion 30 may also be placed on the vehicle width direction inside of the rear tire 16 (the front tire 206).

The invention claimed is:

1. A wheel well rear portion structure, comprising:
   an introduction portion that is formed at a rear portion of a wheel well covering a wheel, and into which air in the wheel well is introduced;
   a discharge portion that is disposed at a vehicle rear side of the introduction portion and from which the air introduced via the introduction portion is discharged toward the vehicle rear side and a vehicle lower side; and
   a guide portion that has a flow channel, by which the introduction portion and the discharge portion communicate with one another and through which the air introduced via the introduction portion flows toward the vehicle rear side and the vehicle lower side,
   wherein an upper wall of the guide portion configuring the flow channel has a curved portion adjacent to and connected to the discharge portion, the curved portion is curved so as to bulge obliquely forward toward the vehicle lower side as seen in a side view and the curved portion is smoothly connected to a rear spoiler.

2. The wheel well rear portion structure according to claim 1, wherein:
   a groove portion, that opens toward the vehicle front side and extends in a vehicle vertical direction, is formed at the rear portion of the wheel well; and
   an upper end portion of the groove portion is placed at a vehicle width direction outer side portion of the wheel well and a lower end portion of the groove portion communicates with the introduction portion.

3. The wheel well rear portion structure according to claim 1, wherein the discharge portion is placed at a vehicle width direction inner side of the introduction portion.

4. The wheel well rear portion structure according to claim 1, wherein at least part of the introduction portion is formed at the vehicle width direction inner side of a vehicle width direction inner side surface of the wheel.

5. The wheel well rear portion structure according to claim 1, wherein the discharge portion is formed at the vehicle width direction inner side of a vehicle width direction inner side surface of the wheel.

6. The wheel well rear portion structure according to claim 1, wherein the guide portion is formed in the shape of a duct.

7. The wheel well rear portion structure according to claim 1, wherein the guide portion is formed in the shape of a groove that opens toward the vehicle front side and the vehicle lower side.

8. A wheel well rear portion structure, comprising:
   an introduction portion that is formed at a rear portion of a wheel well covering a wheel, and into which air in the wheel well is introduced;
   a discharge portion that is disposed at a vehicle rear side of the introduction portion and from which the air introduced via the introduction portion is discharged toward the vehicle rear side and a vehicle lower side; and
   a guide portion that has a flow channel, by which the introduction portion and the discharge portion communicate with one another and through which the air introduced via the introduction portion flows toward the vehicle rear side and the vehicle lower side, with at least part of an upper wall configuring the flow channel being connected to the discharge portion and bulging obliquely forward toward the vehicle lower side as seen in a side view,
   wherein a blocking portion is disposed between the discharge portion and an underbody portion in the vicinity of the vehicle rear side of the discharge portion, the blocking portion being placed at the vehicle lower side of the underbody portion and blocking air flowing along the underbody portion toward a vehicle front side.

9. The wheel well rear portion structure according to claim 8, wherein the blocking portion has a sloped portion that slopes toward the vehicle rear side as it approaches the vehicle lower side as seen in a side view.

10. The wheel well rear portion structure according to claim 8, wherein:
    a vertical wall configuring the blocking portion is formed between the underbody portion and the discharge portion; and
    the vertical wall is placed at the vehicle upper side of the discharge portion and is configured to be elastically deformable in a vehicle front and rear direction.

* * * * *